US008845084B2

(12) United States Patent
Yamazaki et al.

(10) Patent No.: US 8,845,084 B2
(45) Date of Patent: *Sep. 30, 2014

(54) INK JET RECORDING APPARATUS

(75) Inventors: Soichi Yamazaki, Shiojiri (JP); Ayako Nishiki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 13/072,963

(22) Filed: Mar. 28, 2011

(65) Prior Publication Data

US 2011/0234686 A1 Sep. 29, 2011

(30) Foreign Application Priority Data

Mar. 26, 2010 (JP) ................................ 2010-072407

(51) Int. Cl.
*C09D 11/00* (2014.01)
*B41J 2/055* (2006.01)
*B41J 2/14* (2006.01)

(52) U.S. Cl.
CPC .... *B41J 2/14274* (2013.01); *B41J 2002/14419* (2013.01); *B41J 2/055* (2013.01)
USPC .......................................................... 347/100

(58) Field of Classification Search
USPC .......................................................... 347/100
See application file for complete search history.

(56) References Cited

U.S. PATENT DOCUMENTS 7,641,306 B2 1/2010 Ohkuma
8,246,734 B2 8/2012 Okabe et al.
2002/0038613 A1* 4/2002 Yatake ......................... 106/31.6
2002/0085048 A1* 7/2002 Ishinaga et al. ................... 347/6
2004/0010056 A1 1/2004 Takahashi et al.
2005/0062796 A1 3/2005 Mott et al.
2005/0093948 A1* 5/2005 Morris et al. ................ 347/100
2006/0268080 A1* 11/2006 Nakazawa ...................... 347/86
2011/0234685 A1 9/2011 Yamazaki et al.
2011/0234695 A1 9/2011 Yamazaki et al.

FOREIGN PATENT DOCUMENTS

JP 56-166274 A 12/1981
JP 2006-159730 A 6/2006
JP 2007-160549 A 6/2007
JP 2008-001003 A 1/2008
JP 2009-274418 A 11/2009
WO 2009-066372 A1 5/2009

OTHER PUBLICATIONS

Shinri Sakai, "Piezo-housiki Inkujetto Purintingu Gijutsu to PX Ink (Piezoelectric Ink Jet Printing Technique and PX Ink)", Chubu Kagaku-kankei Gakukyoukai-shibu-rengou Shuki Taikai Kouen Yokoushu, p. 75, 34, 2008.
Japan Society of Colour Material, Miharu Kanaya, et al.,"Insatsu Inki Kouza (Printing Ink Course)", p. 51, Japan Society of Colour Material, 2007.

* cited by examiner

*Primary Examiner* — Laura Martin
(74) *Attorney, Agent, or Firm* — Nutter McClennen & Fish LLP

(57) ABSTRACT

An ink jet recording apparatus including an ink jet head for ejecting a water-based ink while moving at a speed of 0.5 m/s or more relative to a recording medium, wherein the water-based ink contains a fatty acid and a volatile alcohol, the volatile alcohol being used to emulsify the fatty acid and disperse the fatty acid in water and having a higher vapor pressure than water at 20° C.

8 Claims, 3 Drawing Sheets

INK JET RECORDING APPARATUS

BACKGROUND

1. Technical Field

The present invention relates to an ink jet recording apparatus.

2. Related Art

In ink jet recording apparatuses, there are demands for high-speed, high-quality image forming.

JP-A-2008-1003 discloses an ink jet image recording method that can ensure ink ejection stability even at high-speed output and reduce the formation of satellites during ink ejection to prevent image degradation. In accordance with this method, the surface tension of ink is controlled by the physical properties of the ink, the ink ejection speed, the ink ejection frequency, and the like to effectively and quickly cut the tail of an ink droplet extending from a nozzle during ink ejection.

However, without considering factors other than the surface tension of ink in the formation of satellites, the ink jet image recording method provides insufficient satellite prevention measures.

Another factor in the formation of satellites is the viscosity of ink, for example. A high ink viscosity results in an ink droplet having a longer tail, which splits into two or more droplets, the main droplet and satellite droplet(s), during the flight of the ink droplet. These droplets land as two or more dots on a recording medium, thereby degrading images.

SUMMARY

An advantage of some aspects of the invention is that it provides an ink jet recording apparatus that can reduce the formation of satellites and produce high-quality images at high speed.

In order to solve the problems described above, an ink jet recording apparatus includes an ink jet head for ejecting a water-based ink while moving at a speed of 0.5 m/s or more relative to a recording medium, wherein the water-based ink contains a fatty acid and a volatile alcohol, the volatile alcohol being used to emulsify the fatty acid and disperse the fatty acid in water and having a higher vapor pressure than water at 20° C.

The fatty acid poorly soluble in water is emulsified with the volatile alcohol and is dispersed in a solvent (water) of the water-based ink. During the flight of an ejected ink droplet, the alcohol that mediates between the fatty acid and water volatilizes on the surface of the ink droplet. Upon the volatilization of the alcohol on the surface of the ink droplet, the fatty acid poorly soluble in water is separated out onto the surface of the ink droplet to form an oil film. The oil film of the fatty acid covers the ink droplet, thereby preventing the fragmentation of the droplet resulting from tailing. This can reduce the formation of satellites in high-speed printing. In the ejection of a water-based ink onto a recording medium while at least one of an ink jet head and the recording medium is moving, a difference in the landing positions of the main droplet and a satellite droplet, if any, is small at a low relative speed (a relative speed of less than 0.5 m/s). Thus, the satellite dot is inconspicuous on the recording medium. In contrast, a high relative speed between the ink jet head and the recording medium (a relative speed of 0.5 m/s or more) results in a large difference in the landing positions of the main droplet and the satellite droplet, resulting in a conspicuous satellite dot on the recording medium. The invention is therefore particularly effective at a high relative speed.

Furthermore, use of the volatile alcohol as a dispersant can stabilize the fatty acid dispersed in the water-based ink. Fatty acids have low solubility and dispersion stability in water and are therefore easily separated out as in a dressing containing a vegetable oil (which is mainly composed of a fatty acid). Thus, the shelf lives of inks containing fatty acids are as short as few minutes to few months. Alcohols are compatible with both fatty acids and water and can therefore be used to emulsify and disperse fatty acids in water, thereby extending the shelf lives of inks. A fatty acid separated out and left to stand in the atmosphere on a nozzle surface will be oxidized, discolored, and solidified, possibly causing nozzle-out. Alcohols can retard the separation of a fatty acid from water, thereby preventing nozzle-out.

Furthermore, the simultaneous addition of a fatty acid and a volatile alcohol to an ink can optimize the evaporation rate of the ink. Since a volatile alcohol added alone to an ink volatilizes rapidly, the ink evaporates and thickens rapidly. Thus, even when a nozzle is capped, nozzle-out occurs in several tens of minutes. The fatty acid can retard the volatilization of the alcohol. Thus, in the simultaneous addition of a volatile alcohol and a fatty acid to an ink, the fatty acid can retard the volatilization of the alcohol, thereby optimizing the evaporation rate of the ink.

It is preferable that the fatty acid has a higher surface tension than the water-based ink at 20° C.

This allows an oil film of the fatty acid having a high surface tension to cover the surface of an ink droplet, thereby preventing the formation of satellites.

A lower surface tension of an ink droplet results in a higher occurrence of satellites. A decrease in the surface tension of water, for example, by the addition of a surfactant facilitates the formation of a film, like soap bubbles. The same mechanism probably works in the invention.

The surface of an ink droplet onto which a fatty acid is separated out had a high surface tension. An ink droplet having a higher surface tension has a shorter tail in the same way that a soap bubble is rarely formed at a high surface tension. This can reduce the fragmentation of the ink droplet or the formation of satellites resulting from tailing.

It is preferable that the fatty acid has a surface tension lower than the critical surface tension of cellulose at 20° C.

The surface tension of the fatty acid separated out onto the surface of the ink droplet that is lower than the critical surface tension of cellulose (paper) can facilitate the penetration of the ink into the paper.

An increase in the surface tension of an ink droplet to reduce the formation of satellites results in a low ability of the ink to penetrate paper. With a low ability of the ink to penetrate paper, the paper remains wet with the ink. This may cause adhesion of the ink to a paper feed roller or a hand.

To avoid this, the fatty acid separated out onto the surface of an ink droplet has a surface tension lower than the critical surface tension of paper, thereby facilitating the penetration of the fatty acid into the paper. This facilitates the penetration of the ink into the paper.

It is preferable that the fatty acid has a higher viscosity than the water-based ink at 20° C.

The fatty acid having a high viscosity dispersed in water is separated out onto the surface of an ink droplet during the flight of the ink droplet. This can reduce the internal viscosity of the ink droplet, thereby shortening the tail of the ink droplet and reducing the formation of satellites.

A higher viscosity of an ink droplet results in a higher occurrence of satellites. For example, an increase in the liquid viscosity (film strength) of a soap solution by the addition of sugar can increase the size of soap bubbles. A liquid having a high viscosity, such as honey or an adhesive, has low fluidity and extends easily. The same mechanism probably works in the tailing of an ink jet droplet.

In order to shorten the tail of an ink droplet, contrary to the way of forming a large soap bubble, the internal viscosity of the ink droplet may be reduced to reduce the viscosity or liquid strength within a film. When a liquid within an ink droplet has a lower viscosity than the surface of the ink droplet, the liquid has greater fluidity than the surface of the ink droplet. Thus, the tail of the ink droplet easily becomes thin enough to be cut appropriately. The separation of the fatty acid having a high viscosity onto the surface of the ink droplet can reduce the internal viscosity of the ink droplet, thereby shortening the tail of the ink droplet. This can reduce the fragmentation of the ink droplet or the formation of satellites resulting from tailing.

The addition of a fatty acid having a high viscosity alone to an ink results in an increase in the viscosity of the ink, deterioration in ejection performance, a decrease in ejection speed, low landing accuracy, and poor image quality. This is because general ink jet inks containing various additive agents for high functionality have a high viscosity. In addition, in order to achieve quick-drying, prevent the curling of paper sheets, and increase the coloring material concentration to produce high-quality images with small ink droplets, general ink jet inks have a high viscosity with a limited water content. Thus, the viscosities of general ink jet inks are close to the maximum viscosity at which a head can eject the inks. For this reason, the addition of a fatty acid having a high viscosity alone to reduce the formation of satellites results in an excessively high viscosity and a higher occurrence of satellites.

In accordance with the invention, a fatty acid having a high viscosity is emulsified with a volatile alcohol and is then dispersed in an ink. This can prevent an excessively high increase in the viscosity of the ink resulting from the addition of the fatty acid having a high viscosity. The prevention of an excessively high increase in the viscosity of the ink can prevent deterioration in ejection performance, a decrease in ejection speed, low landing accuracy, poor image quality, and increased formation of satellites.

It is preferable that the fatty acid has an HLB value of less than three.

In order to separate out the fatty acid onto the surface of an ink droplet during the flight of the ink droplet, the fatty acid preferably has a low solubility in water, that is, high lipophilicity with an HLB value of less than three.

Fatty acid metal salts and fatty acid esters having an HLB value of three or more have high solubility in water and are rarely separated out onto the surface of an ink droplet during the flight of the ink droplet. Furthermore, fatty acid metal salts and fatty acid esters have low surface tension and therefore cannot significantly reduce the formation of satellites.

It is preferable that the volatile alcohol has a lower viscosity than the water-based ink at 20° C.

The volatile alcohol having a lower viscosity than the water-based ink can easily move to the surface of the ink. Thus, the volatile alcohol can easily volatilize during the flight of an ink droplet, and consequently the fatty acid can be easily separated out onto the surface of the ink droplet.

It is preferable that the fatty acid is oleic acid, and the volatile alcohol is ethanol.

Ethanol has a boiling point of 78° C., is easy to handle, and can dissolve some fatty acids.

Oleic acid has high oxidative stability and is liquid at normal temperature. Many unsaturated fatty acids have two or more double bonds and are easily oxidized by the abstraction of a methylene hydrogen between double bonds. Oleic acid, which is an unsaturated fatty acid having one double bond, has no methylene hydrogen and therefore has much higher oxidative stability than unsaturated fatty acids having two or more double bonds. Saturated fatty acids having no double bond have still higher oxidative stability. However, most of oxidatively stable saturated fatty acids are solid at normal temperature and are not suitable for use in ink. Thus, the fatty acid is preferably oleic acid, which is liquid at normal temperature.

It is preferable that the water-based ink contains 0.05% by weight or more and 3.00% by weight or less oleic acid as the fatty acid, and 0.05% by weight or more and 3.00% by weight or less ethanol as the volatile alcohol.

Less than 0.05% by weight oleic acid cannot sufficiently reduce the formation of satellites. More than 3.00% by weight oleic acid results in low dispersion stability.

Less than 0.05% by weight ethanol results in low dispersion stability of oleic acid. More than 3.00% by weight ethanol results in excessive evaporation of the ink and an increase in the viscosity of the ink, increasing the formation of satellites.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
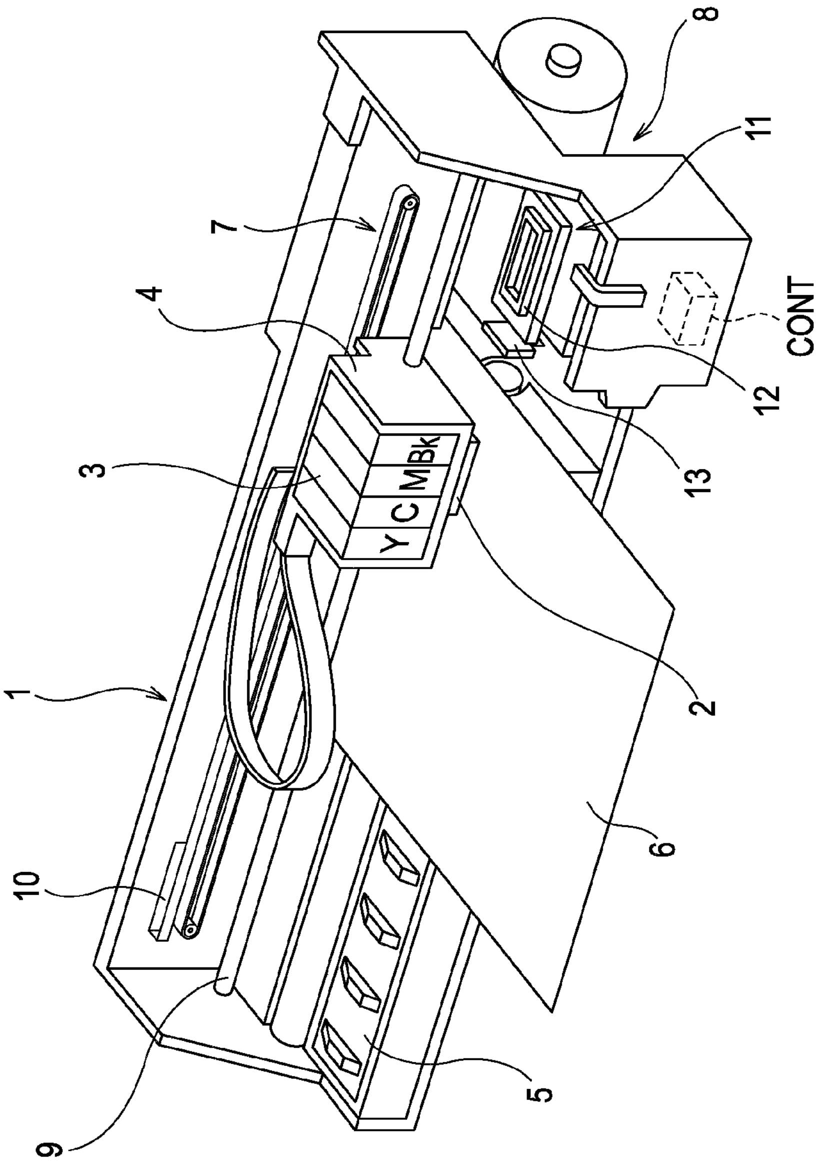
FIG. 1 is a perspective view of a printer according to an embodiment of the invention.

Ink jet recording apparatuses according to embodiments of the invention will be described below with reference to the drawings. In the drawings, the sizes of components are appropriately altered for the sake of clarity. An ink jet printer (hereinafter referred to simply as a printer) is exemplified as an ink jet recording apparatus according to an embodiment of the invention.

FIG. 1 is a perspective view of a printer 1 according to an embodiment of the invention.

The printer 1 includes a recording head (ink jet head) 2, a carriage 4 in which an ink cartridge 3 is removably mounted, a platen 5 for transporting a recording paper sheet (recording medium) 6 disposed below the recording head 2, a carriage drive mechanism 7 for moving the carriage 4 in the width direction of the recording paper sheet 6, and a paper feed mechanism 8 for transporting the recording paper sheet 6 in a paper feed direction. The printer 1 further includes a controller CONT for controlling the operation of the printer 1. The paper width direction is the main scanning direction (the head scanning direction). The paper feed direction is a sub-scanning direction (a direction perpendicular to the main scanning direction).

Although the ink cartridge 3 is mounted in the carriage 4 in the present embodiment, the ink cartridge 3 may be mounted on a housing of the printer 1 and supply the ink to the recording head 2 through an ink supply tube. The ink cartridge 3 contains different color inks, such as yellow (Y), magenta (M), cyan (C), and black (Bk).

A guide rod 9 is a supporting member disposed in the main scanning direction. The guide rod 9 supports the carriage 4. The carriage drive mechanism 7 can move the carriage 4 along the guide rod 9 in the main scanning direction. A linear encoder 10 can determine the position of the carriage 4 in the main scanning direction. This position information is sent to the controller CONT. The controller CONT can determine the scanning position of the recording head 2 from the position information of the linear encoder 10 and control the recording operation (discharging operation) of the recording head 2. The controller CONT can control the moving speed of the carriage 4.

Figure 2:
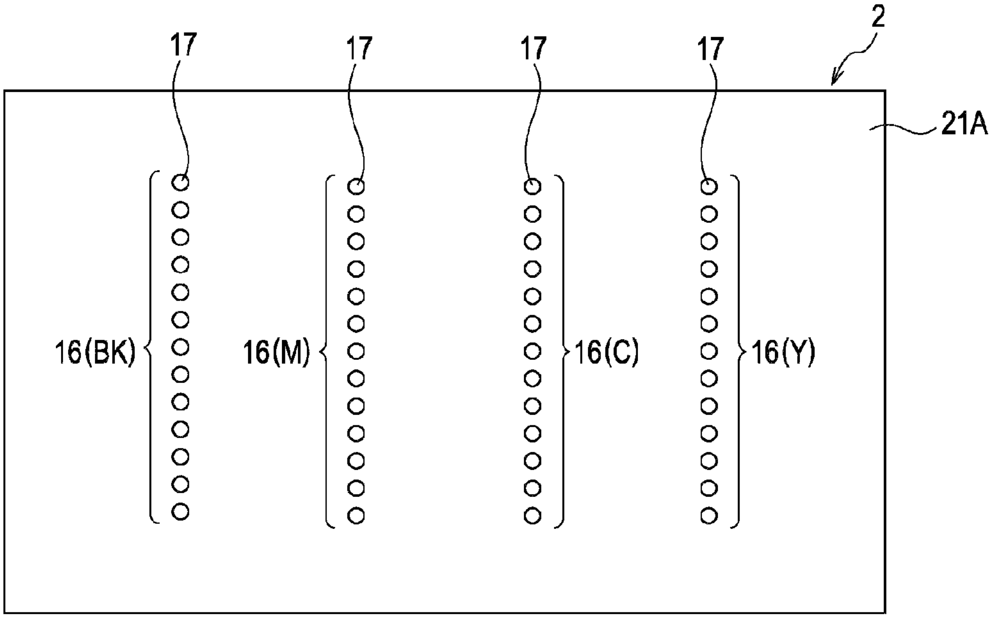
FIG. 2 is a schematic view of the arrangement of nozzles in a recording head according to an embodiment of the invention.

FIG. 2 is a schematic view of the arrangement of nozzles 17 in a recording head 2 according to an embodiment of the invention.

The recording head 2 has a nozzle-forming surface (ejection surface) 21A in which a plurality of nozzles 17 for ejecting inks are disposed. The nozzles 17 constitute nozzle arrays 16 on the nozzle-forming surface 21A. Each of the nozzle arrays 16 can eject a different color ink. In the present embodiment, four nozzle arrays 16 (16(Bk), 16(M), 16(C), and 16(Y)) correspond to four ink colors. For example, each of the nozzle arrays 16 includes 180 nozzles 17.

Figure 3:
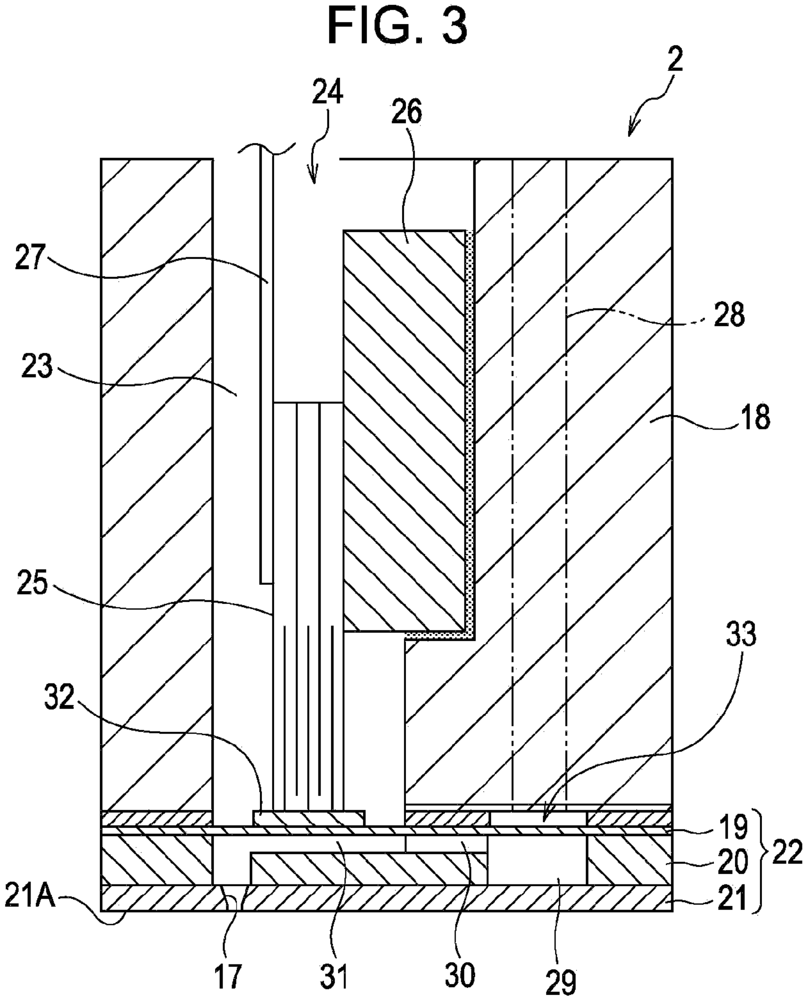
FIG. 3 is a fragmentary sectional view of a recording head according to an embodiment of the invention.

FIG. 3 is a fragmentary sectional view of a recording head 2 according to an embodiment of the invention.

The recording head 2 includes a head main body 18 and a flow-path-forming unit 22 attached to the head main body 18. The flow-path-forming unit 22 includes a diaphragm 19, a flow path substrate 20, a nozzle substrate 21, a common ink chamber 29, an ink supply port (outlet) 30, and a pressure chamber 31. The flow-path-forming unit 22 further includes an island portion 32, which functions as a diaphragm, and a compliance portion 33 for accommodating variations in the pressure of the common ink chamber 29. The head main body 18 includes a housing space 23, which houses a fixing member 26 and a drive unit 24, and an inner flow path 28 for guiding an ink to the flow-path-forming unit 22.

The recording head 2 is a piezoelectric recording head. A piezoelectric element 25 can expand and contract in response to drive signals input from the drive unit 24 through a cable 27. The expansion and contraction deform (move) the diaphragm 19 closer to and away from the nozzle substrate 21. This alters the volume and consequently the pressure of the pressure chamber 31 containing the ink. These variations in pressure allow the ink to be ejected from the nozzles 17.

Referring back to FIG. 1, the scanning start position or the home position of the recording head 2 is located outside the platen 5. A maintenance unit 11 is disposed at the home position. The maintenance unit 11 can perform a wetting operation, a flushing operation, a suction operation (head cleaning), and a wiping operation. In the wetting operation, while the apparatus is inactive, the recording head 2 is sealed with a cap member 12 to prevent the drying of an ink. In the flushing operation, preliminary ejection of the ink from the nozzles 17 of the recording head 2 onto the cap member 12 can prevent the clogging of the nozzles 17 with thickened ink and adjust the meniscuses in the nozzles 17, thereby ensuring normal ejection of the ink from the recording head 2. In the suction operation (head cleaning), after the recording head 2 is sealed with the cap member 12, thickened ink and contaminants in the nozzles 17 are removed with a suction pump (not shown) to adjust the meniscuses, thereby ensuring normal ejection of the ink from the recording head 2. In the wiping operation, the nozzle-forming surface 21A of the recording head 2 is wiped with a wiping member 13 to remove ink deposited on the neighborhood of the nozzles 17 and thickened ink. The wiping operation also involves purging in which the meniscuses of the nozzles 17 are destroyed and readjusted.

The ink ejected from the recording head 2 will be described below.

An ink according to the present embodiment is a type of superpenetrating water-based ink. The superpenetrating water-based ink may be not only a pigment ink or a dye ink but also a functional water-based ink containing a dye, metal fine particles, ceramic fine particles, semiconductor fine particles, or a resin. The term "superpenetrating" in the context of ink means that the surface tension is lower than the critical surface tension of cellulose (paper).

The water-based ink may contain various additives. Examples of the additives include surfactants, humectants, pH-adjusting agents, pigments, dyes, coloring matter, metal fine particles, ceramic fine particles, semiconductor fine particles, resins, organic solvents, metal ions, anti-curling agents, anti-breeding agents, anti-puddling agents, penetration modifiers, preservatives, fungicides, dissolution aids, and antioxidants. These additives are preferably used in combination depending on the application.

A fatty acid and a volatile alcohol are added to the water-based ink to produce the ink according to the present embodiment.

The volatile alcohol used in the ink according to the present embodiment can emulsify and disperse the fatty acid in a solvent (water) of the water-based ink and has a higher vapor pressure than water at 20° C. The volatile alcohol preferably has a lower surface tension than the water-based ink at 20° C. The volatile alcohol preferably has a lower viscosity than the water-based ink at 20° C.

Examples of the volatile alcohol for use in the present embodiment include methanol, ethanol, and propanol. Ethanol has a boiling point of 78° C., is easy to handle, and can dissolve some fatty acids. Thus, the volatile alcohol for use in the present embodiment is preferably ethanol.

The fatty acid for use in the ink according to the present embodiment has higher surface tension and viscosity than the water-based ink at 20° C., a surface tension lower than the critical surface tension of cellulose, and lipophilicity with an HLB value of less than three. In order to reduce the formation of satellites, the fatty acid preferably has a higher surface tension than the water-based ink. In order to penetrate paper, the fatty acid preferably has a surface tension lower than the critical surface tension of paper. Since the critical surface tension of cellulose ranges from 40 to 45 mN/m, the fatty acid preferably has a surface tension of less than 40 mN/m. The fatty acid is preferably liquid at normal temperature so that the fatty acid separated out does not become solid.

In the strict sense, the HLB value, a measure of hydrophilicity or lipophilicity, varies with measurement methods, such as an Atlas method and a PIT method. However their differences are insignificant. An HLB value of less than three as determined by any measurement method is indicative of lipophilic. The fatty acid for use in the ink according to the present embodiment has an HLB value of less than three as determined by one of such measurement methods.

Examples of the fatty acid satisfying such conditions include oleic acid, linoleic acid, and linolenic acid. In terms of oxidative stability, the fatty acid is preferably oleic acid. Oleic acid may be purified or a vegetable oil mainly composed of oleic acid, such as olive oil. Oleic acid has a surface tension of 35 mN/m and an HLB value of 1.

The surface tensions (including the critical surface tension of paper) and the viscosities of the water-based ink, the fatty acid, and the volatile alcohol in the ink according to the present embodiment have the following relationships.

Surface tension: volatile alcohol<water-based ink<fatty acid<cellulose (paper)

Viscosity: volatile alcohol<water-based ink<fatty acid

In the case that the volatile alcohol is ethanol and the fatty acid is oleic acid, the water-based ink preferably satisfies the following relationships at 20° C.

Surface tension: 22 mN/m<water-based ink<35 mN/m

Viscosity: 1.2 mPa·s<water-based ink<35 mPa·s

Provided that the conditions described above are satisfied, the volatile alcohol and the fatty acid may be initially added in the manufacture of the ink or may be added later to an existing superpenetrating water-based dye ink, water-based pigment ink, or functional water-based ink. The later addition is preferred because it does not disturb the entire balance of the ink, obviates the necessity of redesigning, or can easily reduce the formation of satellites in high-speed printing.

The printer 1 according to the present embodiment can reduce the formation of satellites by ejecting the ink while the recording head 2 is moving at a speed of 0.5 m/s or more relative to the recording paper sheet 6. With the serial recording head 2 according to the present embodiment, the relative speed corresponds to the moving speed of the carriage 4 in the main scanning direction. In a line printer having a fixed head, the relative speed corresponds to the moving speed of a paper sheet in a sub-scanning direction.

The present embodiment has larger effects in printing at a higher speed at which satellites are more easily formed and have greater influence. More specifically, at a relative speed of 0.8 m/s or more, the formation of satellites is more effectively reduced.

Since the printer 1 according to the present embodiment employs an ink containing a fatty acid, a piezoelectric ink jet head is preferably used because of a small possibility of the thermal oxidation of the fatty acid. Although a thermal ink jet head may be used for an ink containing a small amount of fatty acid, a piezoelectric ink jet head is preferably used because of a small possibility of nozzle clogging resulting from the oxidation of the fatty acid.

The operation and effect related to the reduction of the formation of satellites in the printer 1 will be described below with reference to FIG. 4.

Figure 4:
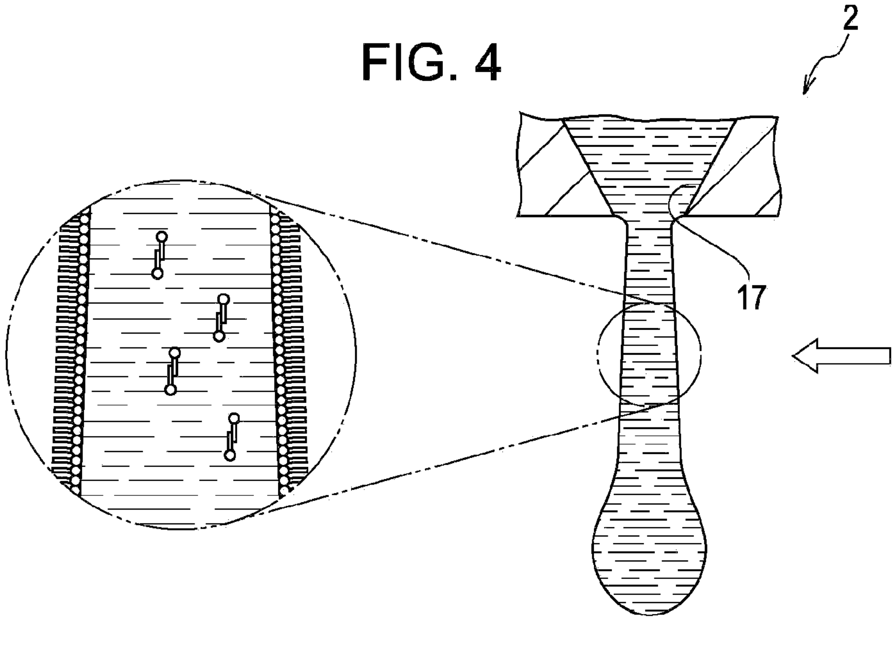
FIG. 4 is a schematic view of an ink droplet just ejected from a nozzle according to an embodiment of the invention.

FIG. 4 is a schematic view of an ink droplet just ejected from a nozzle 17 according to an embodiment of the invention.

A water-based ink containing oleic acid as the fatty acid and ethanol as the volatile alcohol is used in this embodiment.

An ink according to the present embodiment is prepared by emulsifying oleic acid poorly soluble in water using volatile ethanol as a dispersant and dispersing the emulsion in a solvent (water) of a water-based ink. Ethanol that mediates between oleic acid and water volatilizes on the surface of the ejected ink droplet in the atmosphere. Utilizing fast-drying in high-speed printing (at a relative speed of 0.5 m/s or more), the volatilization of ethanol is promoted immediately after ejection. Upon the volatilization of ethanol on the surface of the ink droplet, oleic acid poorly soluble in water is separated out onto the surface of the ink droplet to form an oil film. The oil film of oleic acid covers the ink droplet, thereby preventing the fragmentation of the droplet resulting from tailing. This can reduce the formation of satellites in high-speed printing.

The tailing of an ink droplet from the nozzle 17 immediately after ejection has a large effect on the formation of satellites. Thus, oleic acid should be present on the surface of the ink droplet immediately after ejection. The movement of oleic acid to the surface of the ink droplet just before landing on the recording paper sheet 6 is too late.

In high-speed printing, an ink droplet dries quickly in a current of air (in the direction of the arrow in FIG. 4) caused by the movement of the recording head 2. This can rapidly volatilize ethanol, thereby separating out oleic acid onto the surface of the ink droplet immediately after ejection.

Furthermore, ethanol has a lower viscosity than the water-based ink at 20° C. Ethanol therefore easily moves to the surface of the ink droplet. Thus, ethanol can easily volatilize during the flight of the ink droplet, and consequently oleic acid can be easily separated out onto the surface of the ink droplet immediately after ejection.

In the present embodiment, the fatty acid is lipophilic oleic acid having an HLB value of less than three. Since oleic acid is lipophilic (HLB=1), oleic acid is separated out from water onto the surface of the ink droplet upon the volatilization of ethanol.

The occurrence of satellites increases with decreasing surface tension of an ink droplet. Oleic acid used as the fatty acid in the present embodiment has a higher surface tension than the water-based ink at 20° C. Thus, upon the volatilization of ethanol, the surface of an ink droplet is covered with an oil film of oleic acid having a high surface tension. An ink droplet having a high surface tension tends to assume a spherical shape and has a shortened tail. This can reduce the fragmentation of the ink droplet or the formation of satellites resulting from tailing.

The occurrence of satellites increases with the viscosity of an ink droplet. Oleic acid used as the fatty acid in the present embodiment has a higher viscosity than the water-based ink at 20° C. Thus, the separation of oleic acid having a high viscosity from water onto the surface of an ink droplet during the flight of the ink droplet reduces the internal viscosity of the ink droplet. When a liquid within an ink droplet has a lower viscosity than the surface of the ink droplet, the liquid has greater fluidity than the surface of the ink droplet. Thus, the tail of the ink droplet easily becomes thin enough to be cut appropriately. The separation of oleic acid having a high viscosity onto the surface of the ink droplet can reduce the internal viscosity of the ink droplet, thereby shortening the tail of the ink droplet. This can reduce the fragmentation of the ink droplet or the formation of satellites resulting from tailing.

Oleic acid used as the fatty acid in the present embodiment has a surface tension lower than the critical surface tension of cellulose at 20° C. After the ink droplet landed on the recording paper sheet 6, oleic acid separated out onto the surface of the ink droplet rapidly penetrates cellulose. Thus, the surface tension of the whole ink is predominant and ensures the superpenetration and quick-drying of the ink.

Thus, the printer 1 according to the present embodiment can reduce the formation of satellites and produce high-quality images at a high speed.

EXAMPLES

The advantages of the invention will be further described with reference to the examples. The invention is not limited to these examples, and various modifications may be made in it without departing from the gist of the present invention.

Method for Manufacturing Pigment Ink

PX ink manufactured by Seiko Epson Co. described in a literature (Shinri SAKAI, "Piezo-housiki Inkujetto Purintingu Gijutsu To PX Ink (Piezoelectric Ink Jet Printing Technique and PX Ink)", Chubu Kagaku-kankei Gakukyoukai-shibu-rengou Shuki Taikai Kouen Yokoushu, p. 75, 34, (2008)) was used with a modification.

The PX ink is also described in another literature (Japan Society of Colour Material, Miharu KANAYA, et al., "Insatsu Inki Kouza (Printing Ink Course)", p. 51, Japan Society of Colour Material (2007)).

Oleic acid, an alcohol, and pure water were mixed at a ratio of 1:4:5 by agitation and ultrasonic dispersion to prepare oleic acid dispersion liquid. Two percent by weight of the dispersion liquid was added to a water-based black pigment ink used in a printer PX-B500 manufactured by Seiko Epson Co. and was subjected to agitation and ultrasonic dispersion. The pure water in the oleic acid dispersion liquid allows the formation of a stable micellar structure of oleic acid in water before the oleic acid dispersion liquid was added to the ink and improves the dispersion stability of oleic acid in the ink.

The ink of PX-B500 (hereinafter also referred to as a PX ink) had a surface tension of 27 mN/m. The ink containing oleic acid (hereinafter also referred to as a modified PX ink) had a surface tension of 28 mN/m.

Method for Determining Formation of Satellites

A black ink cartridge of the printer PX-B500 manufactured by Seiko Epson Co. was filled with the modified ink and was ready for printing. The printer PX-B500 manufactured by Seiko Epson Co. has a head carriage speed of 1.1 m/s. The printer was modified such that the carriage speed was variable between 0.25 and 1.1 m/s. The relationship between printing speed and the formation of satellites was examined. The presence or absence of satellites in characters printed on a superfine paper manufactured by Seiko Epson Co. was determined under a microscope.

Ideally, satellites should be completely prevented. However the fragmentation of an ink droplet in the air is a matter of probability. Thus, it is difficult to completely prevent the fragmentation in any situation. No observation of satellites in printed matter suffices for practical applications. It is believed that the human eye at a distance between paper and the eye of 30 cm can detect a deviation of 60 μm or more. Thus, the practical criteria for the presence of satellites are defined as follows in the present example.

Poor: "Presence of satellites" means that the distance between the main dot and a satellite in printed matter is 60 μm or more.

Fair: "Absence of satellites (with prevention effect)" means that the distance between the main dot and a satellite in printed matter is less than 60 μm.

Excellent: "Complete absence of satellites" means that the distance between the main dot and a satellite in printed matter is 0 μm.

Table 1 shows the compositions of inks, the carriage speed, and the presence of satellites as determined by the criteria described above.

In Example 1, a modified PX ink manufactured by the ink manufacturing method described above was used to determine the formation of satellites in accordance with the criteria.

Inks according to Comparative Examples 1 to 3 were manufactured by the ink manufacturing procedures described in Example 1 except that the composition was altered as shown in Table 1. The presence or absence of satellites was determined in the same manner as in Example 1.

In Comparative Examples 4 to 8, a normal PX ink was used to determine the presence or absence of satellites in the same manner as in Example 1 except that the carriage speed was varied in the range of 0.3 to 0.9 m/s.

In Examples 2 to 7, a modified PX ink was used to determine the presence or absence of satellites in the same manner as in Example 1 except that the carriage speed was varied in the range of 0.6 to 1.1 m/s.

In Example 8, a modified PX ink (magenta) manufactured by the ink manufacturing method described above was used to determine the presence or absence of satellites in the same manner as in Example 1.

In Example 9, a modified PX ink (cyan) manufactured by the ink manufacturing method described above was used to determine the presence or absence of satellites in the same manner as in Example 1.

In Example 10, a modified PX ink (yellow) manufactured by the ink manufacturing method described above was used to determine the presence or absence of satellites in the same manner as in Example 1.

TABLE 1

| | Composition of ink | | | | Carriage speed Relative | Satellite Distance between | Satellite Dispersion stability after |
|---|---|---|---|---|---|---|---|
| | Ink of PX-B500 | Oleic acid | Ethanol | Pure Water | to paper | main dot and satellite dot | storage for 1 month |
| Example 1 | 98 wt % | 0.2 wt % | 0.8 wt % | 1 wt % | 0.5 m/s | Excellent | Excellent |
| Comparative example 1 | 98 wt % | 0.2 wt % | — | 1 wt % | 0.5 m/s | Excellent | Poor |
| Comparative example 2 | 98 wt % | — | 0.8 wt % | 1 wt % | 0.5 m/s | Poor | Poor |
| Comparative example 3 | 98 wt % | — | — | 1 wt % | 0.5 m/s | Poor | Poor |
| Comparative example 4 | 100 wt % | — | — | — | 0.3 m/s | Fair | Fair |
| Comparative example 5 | 100 wt % | — | — | — | 0.4 m/s | Fair | Fair |
| Comparative example 6 | 100 wt % | — | — | — | 0.5 m/s | Poor | Poor |
| Comparative example 7 | 100 wt % | — | — | — | 0.6 m/s | Poor | Poor |

TABLE 1-continued

| | Composition of ink | | | | Carriage speed Relative | Satellite Distance between | Satellite Dispersion stability after |
|---|---|---|---|---|---|---|---|
| | Ink of PX-B500 | Oleic acid | Ethanol | Pure Water | to paper | main dot and satellite dot | storage for 1 month |
| Comparative example 8 | 100 wt % | — | — | — | 0.9 m/s | Poor | Poor |
| Example 2 | 98 wt % | 0.2 wt % | 0.8 wt % | 1 wt % | 0.6 m/s | Excellent | Excellent |
| Example 3 | 98 wt % | 0.2 wt % | 0.8 wt % | 1 wt % | 0.7 m/s | Excellent | Excellent |
| Example 4 | 98 wt % | 0.2 wt % | 0.8 wt % | 1 wt % | 0.8 m/s | Excellent | Excellent |
| Example 5 | 98 wt % | 0.2 wt % | 0.8 wt % | 1 wt % | 0.9 m/s | Excellent | Fair |
| Example 6 | 98 wt % | 0.2 wt % | 0.8 wt % | 1 wt % | 1.0 m/s | Fair | Fair |
| Example 7 | 98 wt % | 0.2 wt % | 0.8 wt % | 1 wt % | 1.1 m/s | Fair | Fair |
| Example 8 | 98 wt % | 0.2 wt % | 0.8 wt % | 1 wt % | 0.5 m/s | Excellent | Excellent |
| Example 9 | 98 wt % | 0.2 wt % | 0.8 wt % | 1 wt % | 0.5 m/s | Excellent | Excellent |
| Example 10 | 98 wt % | 0.2 wt % | 0.8 wt % | 1 wt % | 0.5 m/s | Excellent | Excellent |

Table 1 shows that a combination of oleic acid and ethanol reduced the formation of satellites. Table 1 also shows that the formation of satellites was effectively reduced at a carriage speed of 0.5 m/s or more. Table 1 also shows that a combination of oleic acid and ethanol effectively reduced the formation of satellites in the color inks, as well as the black ink.

Table 2 shows the compositions of inks, the carriage speed, and the presence of satellites as determined by the criteria described above.

In Comparative Examples 9 to 14 and Examples 11 to 22, modified PX inks manufactured at different ratios of oleic acid to ethanol were used to determine the presence or absence of satellites in the same manner as in Example 1.

Table 2 shows that the formation of satellites was not effectively reduced at an oleic acid content of less than 0.05% by weight. Table 2 also shows that more than 3% by weight oleic acid resulted in poor dispersion stability.

Table 3 shows the compositions of inks, the carriage speed, and the presence of satellites as determined by the criteria described above.

In Comparative Examples 15 to 22 and Examples 23 to 32, modified PX inks manufactured at different ratios of oleic acid to ethanol were used to determine the presence or absence of satellites in the same manner as in Example 1.

TABLE 2

| | Composition of ink | | | | Carriage speed | Satellite Distance between | Satellite Dispersion stability after |
|---|---|---|---|---|---|---|---|
| | Ink of PX-B500 | Oleic acid | Ethanol | Pure Water | Relative to paper | main dot and satellite dot | storage for 1 month |
| Comparative example 9 | 98.19 wt % | 0.01 wt % | 0.8 wt % | 1 wt % | 0.5 m/s | Poor | Poor |
| Comparative example 10 | 98.17 wt % | 0.03 wt % | 0.8 wt % | 1 wt % | 0.5 m/s | Poor | Poor |
| Example 11 | 98.15 wt % | 0.05 wt % | 0.8 wt % | 1 wt % | 0.5 m/s | Fair | Fair |
| Example 12 | 98.1 wt % | 0.1 wt % | 0.8 wt % | 1 wt % | 0.5 m/s | Excellent | Excellent |
| Example 13 | 97.7 wt % | 0.5 wt % | 0.8 wt % | 1 wt % | 0.5 m/s | Excellent | Excellent |
| Example 14 | 97.2 wt % | 1 wt % | 0.8 wt % | 1 wt % | 0.5 m/s | Excellent | Excellent |
| Example 15 | 96.2 wt % | 2 wt % | 0.8 wt % | 1 wt % | 0.5 m/s | Excellent | Fair |
| Example 16 | 95.2 wt % | 3 wt % | 0.8 wt % | 1 wt % | 0.5 m/s | Excellent | Fair |
| Example 17 | 94.2 wt % | 4 wt % | 0.8 wt % | 1 wt % | 0.5 m/s | Fair | Fair |
| Example 18 | 93.2 wt % | 5 wt % | 0.8 wt % | 1 wt % | 0.5 m/s | Fair | Fair |
| Comparative example 11 | 98.93 wt % | 0.02 wt % | 0.05 wt % | 1 wt % | 0.5 m/s | Poor | Poor |
| Example 19 | 98.9 wt % | 0.05 wt % | 0.05 wt % | 1 wt % | 0.5 m/s | Fair | Fair |
| Example 20 | 95.95 wt % | 3 wt % | 0.05 wt % | 1 wt % | 0.5 m/s | Fair | Fair |
| Comparative example 12 | 93.95 wt % | 5 wt % | 0.05 wt % | 1 wt % | 0.5 m/s | Poor | Poor |
| Comparative example 13 | 95.98 wt % | 0.02 wt % | 3 wt % | 1 wt % | 0.5 m/s | Poor | Poor |
| Example 21 | 95.95 wt % | 0.05 wt % | 3 wt % | 1 wt % | 0.5 m/s | Fair | Fair |
| Example 22 | 93 wt % | 3 wt % | 3 wt % | 1 wt % | 0.5 m/s | Fair | Fair |
| Comparative example 14 | 91 wt % | 5 wt % | 3 wt % | 1 wt % | 0.5 m/s | Poor | Poor |

TABLE 3

| | Composition of ink | | | | Carriage speed | Satellite Distance between | Satellite Dispersion stability after |
|---|---|---|---|---|---|---|---|
| | Ink of PX-B500 | Oleic acid | Ethanol | Pure Water | Relative to paper | main dot and satellite dot | storage for 1 month |
| Comparative example 15 | 98.79 wt % | 0.2 wt % | 0.01 wt % | 1 wt % | 0.5 m/s | Poor | Poor |
| Comparative example 16 | 98.77 wt % | 0.2 wt % | 0.03 wt % | 1 wt % | 0.5 m/s | Poor | Poor |
| Example 23 | 98.75 wt % | 0.2 wt % | 0.05 wt % | 1 wt % | 0.5 m/s | Fair | Fair |
| Example 24 | 98.7 wt % | 0.2 wt % | 0.1 wt % | 1 wt % | 0.5 m/s | Excellent | Fair |
| Example 25 | 98.3 wt % | 0.2 wt % | 0.5 wt % | 1 wt % | 0.5 m/s | Excellent | Excellent |
| Example 26 | 97.8 wt % | 0.2 wt % | 1 wt % | 1 wt % | 0.5 m/s | Excellent | Excellent |
| Example 27 | 96.8 wt % | 0.2 wt % | 2 wt % | 1 wt % | 0.5 m/s | Excellent | Excellent |
| Example 28 | 95.8 wt % | 0.2 wt % | 3 wt % | 1 wt % | 0.5 m/s | Fair | Fair |
| Comparative example 17 | 94.8 wt % | 0.2 wt % | 4 wt % | 1 wt % | 0.5 m/s | Poor | Poor |
| Comparative example 18 | 93.8 wt % | 0.2 wt % | 5 wt % | 1 wt % | 0.5 m/s | Poor | Poor |
| Comparative example 19 | 98.93 wt % | 0.05 wt % | 0.02 wt % | 1 wt % | 0.5 m/s | Poor | Poor |
| Example 29 | 98.9 wt % | 0.05 wt % | 0.05 wt % | 1 wt % | 0.5 m/s | Fair | Fair |
| Example 30 | 95.95 wt % | 0.05 wt % | 3 wt % | 1 wt % | 0.5 m/s | Fair | Fair |
| Comparative example 20 | 93.95 wt % | 0.05 wt % | 5 wt % | 1 wt % | 0.5 m/s | Poor | Poor |
| Comparative example 21 | 95.98 wt % | 3 wt % | 0.02 wt % | 1 wt % | 0.5 m/s | Poor | Poor |
| Example 31 | 95.95 wt % | 3 wt % | 0.05 wt % | 1 wt % | 0.5 m/s | Fair | Fair |
| Example 32 | 93 wt % | 3 wt % | 3 wt % | 1 wt % | 0.5 m/s | Fair | Fair |
| Comparative example 22 | 91 wt % | 3 wt % | 5 wt % | 1 wt % | 0.5 m/s | Poor | Poor |

Table 3 shows that more than 3% by weight ethanol resulted in excessive evaporation of the ink and an increase in the viscosity of the ink, increasing the formation of satellites. Table 3 also shows that less than 0.05% by weight ethanol resulted in poor dispersion stability of oleic acid.

Table 4 shows the compositions of inks, the carriage speed, and the presence of satellites as determined by the criteria described above.

In Example 33, the PX ink was replaced with a water-based dye ink for use in a printer EP-802A manufactured by Seiko Epson Co.

Method for Manufacturing Dye Ink

Oleic acid, an alcohol, and pure water were mixed at a ratio of 1:4:5 by agitation and ultrasonic dispersion to prepare oleic acid dispersion liquid. Two percent by weight of the dispersion liquid was added to a water-based dye ink for use in a printer EP-802A manufactured by Seiko Epson Co. and was subjected to agitation and ultrasonic dispersion.

Method for Determining Formation of Satellites

An ink cartridge of the printer PX-B500 manufactured by Seiko Epson Co. was filled with the modified ink. The formation of satellites in characters printed on a superfine paper manufactured by Seiko Epson Co. was observed under a microscope. The presence or absence of satellites was determined in the same manner as in Example 1.

In Comparative Example 23, an ink cartridge of the modified printer PX-B500 was filled with the water-based dye ink for use in a printer EP-802A manufactured by Seiko Epson Co. The presence or absence of satellites was determined in the same manner as in Example 1.

TABLE 4

| | Composition of ink | | | | Carriage speed | Satellite Distance | Satellite Dispersion stability |
|---|---|---|---|---|---|---|---|
| | Ink of EP-802A | Oleic acid | Ethanol | Pure Water | Relative to paper | between main dot and satellite dot | after storage for 1 month |
| Example 33 | 98 wt % | 0.2 wt % | 0.8 wt % | 1 wt % | 0.9 m/s | Fair | Fair |
| Comparative example 23 | 100 wt % | — | — | — | 0.9 m/s | Poor | Poor |

Table 4 shows that a combination of oleic acid and ethanol effectively reduced the formation of satellites also with the dye water-based ink.

Table 5 shows the compositions of inks, the carriage speed, and the presence of satellites as determined by the criteria described above.

In Comparative Examples 24 to 27, the presence or absence of satellites was determined in the same manner as in Example 1 except that oleic acid was replaced with sodium oleate, oleyl alcohol, ethyl oleate, or sorbitan trioleate, respectively.

TABLE 5

| Amount | Composition of ink 98 wt % | 0.2 wt % | 0.8 wt % | 1 wt % | Carriage speed Relative to paper | Satellite Distance between main dot and satellite dot | Satellite Dispersion stability after storage for 1 month |
|---|---|---|---|---|---|---|---|
| Example 1 | Ink of PX-B500 | Oleic acid | Ethanol | Pure Water | 0.5 m/s | Excellent | Excellent |
| Comparative example 24 | Ink of PX-B500 | Sodium oleate | Ethanol | Pure Water | 0.5 m/s | Poor | Poor |
| Comparative example 25 | Ink of PX-B500 | Oleyl alcohol | Ethanol | Pure Water | 0.5 m/s | Poor | Poor |
| Comparative example 26 | Ink of PX-B500 | Ethyl oleate | Ethanol | Pure Water | 0.5 m/s | Poor | Poor |
| Comparative example 27 | Ink of PX-B500 | Sorbitan trioleate | Ethanol | Pure Water | 0.5 m/s | Poor | Poor |

Oleic acid in Example 1, which has an HLB value of less than three and a higher surface tension than the ink, effectively reduced the formation of satellites.

An aqueous solution of sodium oleate in Comparative Example 24, which has an HLB of 16, larger than three, and a lower surface tension than the ink, did not effectively reduce the formation of satellites.

Oleyl alcohol in Comparative Example 25, which has an HLB of approximately 18, larger than three, and a lower surface tension than the ink, did not effectively reduce the formation of satellites.

Ethyl oleate in Comparative Example 26, which has an HLB of more than three and a lower surface tension than the ink, did not effectively reduce the formation of satellites.

Sorbitan trioleate in Comparative Example 27, which has an HLB of two, smaller than three, but a lower surface tension than the ink, did not effectively reduce the formation of satellites.

Table 5 shows that a fatty acid having an HLB value of less than three and a higher surface tension than the ink can effectively reduce the formation of satellites.

Thus, the simultaneous addition of a fatty acid and a volatile alcohol to a water-based ink and high-speed printing (at a relative speed of 0.5 m/s or more) have the following synergistic effects.

(1) Dispersion Stabilization of Fatty Acid

Fatty acids are not stably dispersed in water or ink but are well dissolved in some alcohols. Fatty acids are slightly dissolved in glycerin, which is one of humectants and one of alcohols. Some alcohols and glycerin are well dissolved in water.

Thus, a particular alcohol in a water-based ink improves the dispersion stabilization of a fatty acid. Glycerin can further improve the dispersion stabilization.

(2) Rapid Separation of Fatty Acid onto Surface of Ink by Action of Volatile Alcohol With an ink containing a volatile alcohol and a fatty acid poorly soluble in water and readily soluble in the volatile alcohol, the volatile alcohol rapidly volatilizes immediately after ejection, thereby rapidly separating out the fatty acid onto the surface.

(3) Rapid Separation of Fatty Acid onto Surface of Ink in High-Speed Printing

In low-speed printing, owing to a low drying speed, a fatty acid cannot be effectively separated out before landing. In high-speed printing, a high drying speed allows the fatty acid to be effectively separated out before the landing of an ink droplet on a print medium.

(4) Reduction of Formation of Satellites Using Fatty Acid Having High Surface Tension When a fatty acid is separated out onto the surface of an ink droplet, the inside of the ink droplet has a low viscosity and a low surface tension, and only the surface has a high surface tension. An ink droplet having a low viscosity and a high surface tension has a short tail in the same way that a soap bubble is rarely formed at a low viscosity and a high surface tension. This can reduce the fragmentation of the ink droplet or the formation of satellites resulting from tailing.

(5) Reduction of Formation of Satellites due to Low Internal Viscosity of Ink Droplet In order to shorten the tail of an ink droplet, the internal viscosity of the ink droplet may be reduced, contrary to the way of forming a large soap bubble. A low internal viscosity results in great fluidity of the internal liquid. Thus, the ink droplet or a soap bubble easily has the smallest possible thickness. The separation of a fatty acid having a high viscosity onto the surface of the ink droplet can reduce the internal viscosity of the ink droplet, thereby shortening the tail of the ink droplet. This can reduce the fragmentation of the ink droplet or the formation of satellites resulting from tailing.

(6) Optimization of Evaporation Rate by Simultaneous Addition of Fatty Acid and Volatile Alcohol The addition of a volatile alcohol alone to an ink results in an excessively high drying speed of the ink and the drying of a nozzle surface. Thus, even when a nozzle is capped, nozzle-out occurs in several tens of minutes. When a volatile alcohol and a fatty acid are simultaneously added to an ink, the fatty acid appropriately reduces the drying speed of the volatile alcohol and consequently the drying speed of an ink droplet. At the same time, the volatilization of the alcohol allows the fatty acid to be rapidly separated out onto the surface of the ink droplet.

Many processes for manufacturing inks include a degassing process (evacuation process). This is because air bubbles in inks for ink jet recording apparatuses often have adverse effects. With an excessively high volatile alcohol content of an ink, therefore, the evaporation of the alcohol causes variations in the composition of the ink, impairing the consistent quality of the ink.

A fatty acid can retard the volatilization of the alcohol. Thus, 3% by weight or less volatile alcohol can maintain the consistent quality of the ink in the evacuation process.

(7) Lipophilicity of Fatty Acid and Regarding Fatty Acid Metal Salt and Fatty Acid Ester In order to achieve the effects described above, the fatty acid should have low solubility in water. Fatty acid metal salts having high solubility in water cannot effectively reduce the formation of satellites. Fatty acid metal salts and fatty acid esters have low surface tension and therefore cannot effectively reduce the formation of satellites.

(8) Oxidative Stability of Fatty Acid

Many unsaturated fatty acids are easily oxidized. This is because many unsaturated fatty acids have two or more double bonds and are easily oxidized by the abstraction of a methylene hydrogen between double bonds. Such unsaturated fatty acids include linoleic acid and linolenic acid. Unsaturated fatty acids having one double bond have no methylene hydrogen and therefore have much higher oxidative stability than unsaturated fatty acids having two or more double bonds. Such unsaturated fatty acids include oleic acid. Saturated fatty acids having no double bond have still higher oxidative stability.

(9) Melting Point of Fatty Acid

A liquid fatty acid separated out onto a nozzle surface has a reduced probability of causing nozzle clogging. Fatty acids that have one or less double bond and are liquid at normal temperature include oleic acid. However, most of oxidatively stable saturated fatty acids are solid at normal temperature and are not suitable for use in ink. Thus, the fatty acid is preferably oleic acid.

(10) Superpenetrating Ink

After an ink droplet landed on a print medium, the penetration ability depends predominantly on the surface tension of the whole ink rather than the surface. This ensures the superpenetration and quick-drying of the ink.

Thus, the invention can reduce the formation of satellites and produce high-quality images at a high speed.

What is claimed is:

1. An ink jet recording apparatus comprising:

an ink jet head for ejecting a water-based ink while moving at a speed of 0.5 m/s or more relative to a recording medium, wherein the water-based ink contains oleic acid in an amount between 0.05% and 3.00% by weight and ethanol in an amount between 0.05% and 3.00% by weight, the ethanol being used to emulsify the oleic acid and disperse the oleic acid in water and having a higher vapor pressure than water at 20° C.

2. The ink jet recording apparatus according to claim 1, wherein the oleic acid has a higher surface tension than the water-based ink at 20° C.

3. The ink jet recording apparatus according to claim 2, wherein the oleic acid has a surface tension lower than the critical surface tension of cellulose at 20° C.

4. The ink jet recording apparatus according to claim 1, wherein the oleic acid has a higher viscosity than the water-based ink at 20° C.

5. The ink jet recording apparatus according to claim 1, wherein the oleic acid has an HLB value of less than three.

6. The ink jet recording apparatus according to claim 1, wherein the ethanol has a lower viscosity than the water-based ink at 20° C.

7. The ink jet recording apparatus of claim 1, wherein the ethanol volatizes immediately after a droplet of the water-based ink is ejected from the ink jet head.

8. The ink jet recording apparatus of claim 1, wherein the oleic acid forms a film over a surface of a droplet of the water-based ink immediately after the droplet is ejected from the ink jet head.

* * * * *